United States Patent
Petterson et al.

(10) Patent No.: US 12,370,505 B2
(45) Date of Patent: Jul. 29, 2025

(54) HYDRO-DIESEL ENGINE SYSTEM HAVING SEPARATE AGITATION MIXING AND CHEMICAL MIXING OF HYDROGEN GAS INTO LIQUID DIESEL FUEL

(71) Applicant: H2DIESEL, INC., Lewes, DE (US)

(72) Inventors: John S. Petterson, La Jolla, CA (US); John L. Haller, La Jolla, CA (US)

(73) Assignee: H2DIESEL, INC., Lewes, DE (US)

( * ) Notice: Subject to any disclaimer, the term of this patent is extended or adjusted under 35 U.S.C. 154(b) by 0 days.

(21) Appl. No.: 18/906,826

(22) Filed: Oct. 4, 2024

(65) Prior Publication Data

US 2025/0114752 A1 Apr. 10, 2025

Related U.S. Application Data

(60) Provisional application No. 63/542,998, filed on Oct. 6, 2023.

(51) Int. Cl.
*B01F 23/23* (2022.01)
*B01F 23/231* (2022.01)
(Continued)

(52) U.S. Cl.
CPC .. *B01F 23/23764* (2022.01); *B01F 23/23105* (2022.01); *B01F 23/2323* (2022.01);
(Continued)

(58) Field of Classification Search
CPC .......... B01F 23/23105; B01F 23/23764; B01F 23/2323; B01F 23/70; B01F 25/103; B01F 25/3141; B01F 25/4331; B01F 25/4321; B01F 35/7544; B01F 2025/9321; B01F 2101/503; F02D 19/0644; F02D 19/0665;
(Continued)

(56) References Cited

U.S. PATENT DOCUMENTS

| 4,259,021 A | 3/1981 | Goudy, Jr. |
| 4,334,889 A | 6/1982 | Takabayashi |

(Continued)

FOREIGN PATENT DOCUMENTS

| CN | 110240953 A | 9/2019 |
| DE | 102013003982 A1 | 9/2014 |

(Continued)

OTHER PUBLICATIONS

United States International Searching Authority, International Search Report and Written Opinion for corresponding International Application No. PCT/US2023/035695, mailed Feb. 7, 2024, 12 pages.

(Continued)

*Primary Examiner* — Hai H Huynh
(74) *Attorney, Agent, or Firm* — David R. Heckadon; Gordon Rees Scully Mansukhani LLP (57) ABSTRACT

A hydro-diesel engine system, including: (a) a hydrogen gas supply and a liquid diesel fuel supply; (b) a bubbilizer configured to agitatedly mix some of the hydrogen gas into diesel fuel to form a mixture of small bubbles of hydrogen gas in the liquid diesel fuel which is then sent into a hydro-diesel engine; together with (c) a system for chemically mixing some of the hydrogen gas with the diesel fuel prior to the diesel fuel entering the bubbilizer.

26 Claims, 8 Drawing Sheets

(51) Int. Cl.
| | |
|---|---|
| *B01F 23/232* | (2022.01) |
| *B01F 23/237* | (2022.01) |
| *B01F 23/70* | (2022.01) |
| *B01F 25/10* | (2022.01) |
| *B01F 25/314* | (2022.01) |
| *B01F 25/421* | (2022.01) |
| *B01F 25/433* | (2022.01) |
| *B01F 35/75* | (2022.01) |
| *F02D 19/06* | (2006.01) |
| *F02D 19/08* | (2006.01) |
| *B01F 25/00* | (2022.01) |
| *B01F 101/00* | (2022.01) |

(52) U.S. Cl.
CPC ............ *B01F 23/70* (2022.01); *B01F 25/103* (2022.01); *B01F 25/3141* (2022.01); *B01F 25/4231* (2022.01); *B01F 25/4331* (2022.01); *B01F 35/7544* (2022.01); *F02D 19/0644* (2013.01); *F02D 19/0665* (2013.01); *F02D 19/0673* (2013.01); *F02D 19/0684* (2013.01); *F02D 19/08* (2013.01); *B01F 2025/9321* (2022.01); *B01F 2101/503* (2022.01)

(58) Field of Classification Search
CPC ... F02D 19/0673; F02D 19/0684; F02D 19/08
USPC ....... 123/1 A, 3, 495, 525, 526, 527, 27 GE, 123/536, DIG. 12
See application file for complete search history.

(56) References Cited

U.S. PATENT DOCUMENTS

| | | | |
|---|---|---|---|
| 4,388,893 | A | 6/1983 | Apfel |
| 4,742,810 | A * | 5/1988 | Anders ................ F02M 27/08 123/538 |
| 6,164,813 | A | 12/2000 | Wang |
| 6,205,981 | B1 | 3/2001 | Lorraine |
| 6,207,064 | B1 | 3/2001 | Gargas |
| 6,478,857 | B2 | 11/2002 | Czabala |
| 6,606,855 | B1 | 8/2003 | Kong et al. |
| 6,641,625 | B1 | 11/2003 | Clawson et al. |
| 6,804,950 | B2 | 10/2004 | Kong et al. |
| 6,988,033 | B1 | 1/2006 | Lowrey et al. |
| 7,377,272 | B2 | 5/2008 | Davidson |
| 7,430,991 | B2 | 10/2008 | VanHoose et al. |
| 7,621,260 | B2 | 11/2009 | Mitani et al. |
| 7,715,961 | B1 | 5/2010 | Kargupta |
| 7,789,047 | B2 | 9/2010 | Kuroki et al. |
| 7,841,762 | B2 * | 11/2010 | Oogawara .......... F02M 25/0225 366/127 |
| 7,861,696 | B2 | 1/2011 | Lund |
| 7,882,789 | B2 | 2/2011 | Kumar et al. |
| 7,946,258 | B2 | 5/2011 | Adams |
| 8,176,884 | B2 | 5/2012 | Tewari et al. |
| 8,333,171 | B2 | 12/2012 | Lund |
| 8,377,180 | B2 | 2/2013 | Maeda et al. |
| 8,478,514 | B2 | 7/2013 | Kargupta |
| 8,544,452 | B1 | 10/2013 | Galvin et al. |
| RE45,413 | E | 3/2015 | Lund |
| 9,388,749 | B2 | 7/2016 | MacDonald |
| 9,527,046 | B1 | 12/2016 | Roe |
| 9,586,186 | B2 | 3/2017 | Roe |
| 9,638,136 | B2 | 5/2017 | Jung |
| 9,884,162 | B2 | 2/2018 | Kobayashi et al. |
| 9,945,299 | B2 | 4/2018 | Lund |
| 10,080,998 | B2 | 9/2018 | Roe et al. |
| 10,280,877 | B2 | 5/2019 | Hamad et al. |
| 10,486,114 | B2 | 11/2019 | Roe |
| 10,494,992 | B2 | 12/2019 | Johnson et al. |
| 10,527,013 | B2 * | 1/2020 | St. Mary ............ F02M 37/0064 |
| 10,605,162 | B2 | 3/2020 | Johnson et al. |
| 10,746,094 | B2 | 8/2020 | Johnson et al. |
| 10,815,123 | B2 | 10/2020 | Northrop |
| 10,920,717 | B1 | 2/2021 | Owens |
| 11,239,479 | B2 | 2/2022 | Katikaneni et al. |
| 11,247,014 | B2 | 2/2022 | Koizumi et al. |
| 11,598,276 | B1 | 3/2023 | Klingbeil et al. |
| 12,134,990 | B2 * | 11/2024 | Petterson ............ F02D 19/0671 |
| 2002/0127445 | A1 | 9/2002 | Carpenter et al. |
| 2004/0101795 | A1 | 5/2004 | Fairfull |
| 2006/0288869 | A1 | 12/2006 | Warren et al. |
| 2007/0020568 | A1 | 1/2007 | Finley |
| 2007/0033929 | A1 | 2/2007 | Telford et al. |
| 2008/0223332 | A1 | 9/2008 | Maro et al. |
| 2008/0223344 | A1 | 9/2008 | Suzuki et al. |
| 2008/0245318 | A1 | 10/2008 | Kuroki et al. |
| 2009/0012698 | A1 | 1/2009 | Shinagawa et al. |
| 2010/0228415 | A1 | 9/2010 | Paul |
| 2010/0294994 | A1 | 11/2010 | Basini et al. |
| 2011/0023853 | A1 | 2/2011 | Lund |
| 2011/0061622 | A1 | 3/2011 | Lund |
| 2012/0037098 | A1 | 2/2012 | Wey |
| 2012/0186560 | A1 | 7/2012 | Lund |
| 2013/0175201 | A1 | 7/2013 | Caliga et al. |
| 2013/0269243 | A1 | 10/2013 | Lund |
| 2015/0081199 | A1 | 3/2015 | Chauncey et al. |
| 2015/0114351 | A1 | 4/2015 | Lund |
| 2015/0136047 | A1 | 5/2015 | Hou |
| 2015/0226113 | A1 | 8/2015 | Alexander et al. |
| 2016/0362114 | A1 | 12/2016 | Chauncey et al. |
| 2019/0085802 | A1 | 3/2019 | St. Mary et al. |
| 2019/0145327 | A1 | 5/2019 | Gieger et al. |
| 2020/0061549 | A1 | 2/2020 | Roe |
| 2021/0101110 | A1 | 4/2021 | Rheaume et al. |
| 2021/0131361 | A1 | 5/2021 | Turner et al. |
| 2022/0325684 | A1 | 10/2022 | Lawhorn |
| 2023/0268538 | A1 | 8/2023 | Wiekamp |
| 2023/0340919 | A1 | 10/2023 | Mercal et al. |
| 2023/0417198 | A1 | 12/2023 | Lund |

FOREIGN PATENT DOCUMENTS

| | | |
|---|---|---|
| DE | 102029213283 A1 | 3/2021 |
| EP | 1883750 B1 | 2/2008 |
| WO | 2006126341 A2 | 11/2006 |
| WO | 2007062217 A2 | 5/2007 |
| WO | 2008125976 A2 | 10/2008 |
| WO | 2014039663 A2 | 3/2014 |
| WO | 2017004551 A1 | 1/2017 |
| WO | 2017205681 A1 | 11/2017 |
| WO | 2022096718 A1 | 5/2022 |
| WO | 2023154174 A1 | 8/2023 |
| WO | 2024091443 A1 | 5/2024 |

OTHER PUBLICATIONS

United States International Searching Authority, International Search Report and Written Opinion for corresponding International Application No. PCT/US2023/037208, mailed Feb. 22, 2024, 10 pages.
Green Car Congress, Hydrogen-Enhanced Combustion Engine Could Improve Gasoline Fuel Economy by 20% to 30%, Nov. 5, 2005, https://www.greencarcongress.com/2005/11/hydrogenenhance.html, 2 pages.
Lee et al., Plasma Assisted Hydrogen Generation: A Mechanistic Review, Fuel Processing Technology 247 (2023) 107761, 16 pages.
United States International Searching Authority, International Search Report and Written Opinion for corresponding International Application No. PCT/US2023/081154, mailed Mar. 28, 2024, 12 pages.
United States International Searching Authority, International Search Report and Written Opinion for corresponding International Application No. PCT/US2023/081152, mailed Apr. 29, 2024, 13 pages.
NissanConnect Services Remote Engine Start/Stop, Nissan, 2022, 4 pages, https://web.archive.org/web/20221203160155/https://www.nissanusa.com/connect/features-apps/remote-engine-start.html.
United States International Searching Authority, Invitation to Pay Additional Fees for corresponding International Application No. PCT/US2024/017795, mailed May 30, 2024, 2 pages.

(56) References Cited

OTHER PUBLICATIONS

United States International Searching Authority, International Search Report and Written Opinion for corresponding International Application No. PCT/US2024/017795, mailed Aug. 7, 2024, 15 pages.

\* cited by examiner

HYDRO-DIESEL ENGINE SYSTEM HAVING SEPARATE AGITATION MIXING AND CHEMICAL MIXING OF HYDROGEN GAS INTO LIQUID DIESEL FUEL

RELATED APPLICATION

The present application claims priority to U.S. Provisional Patent Application Ser. No. 63/542,998, entitled Hydro-Diesel Engine System Having Separate Mechanical and Chemical Mixing of Hydrogen Gas into Liquid Diesel Fuel, filed Oct. 6, 2023, the entire disclosure of which is incorporated herein by reference in its entirety for all purposes.

TECHNICAL FIELD

The present invention relates to hydro-diesel engines.

BACKGROUND OF THE INVENTION

Hydro-diesel engines increase the efficiency of standard diesel engines by adding small or micro-sized bubbles of hydrogen gas into the liquid diesel fuel that is injected into the engine. In such hydro-diesel systems, the hydrogen gas both chemically reacts with the liquid diesel fuel and is also mechanically mixed with the liquid diesel fuel. Mechanical mixing results in small or micro-sized bubbles of hydrogen gas in the liquid diesel fuel. This mixture of hydrogen gas and liquid diesel fuel is formed in the infuser which prepares the gas-liquid fuel mixture for entry into the common rail of the diesel engine.

A disadvantage of this standard hydro-diesel approach is that the chemical mixing and the mechanical mixing of the hydrogen gas and the liquid diesel fuel happens at the same time in the system's infuser. Unfortunately, optimal chemical mixing and optimal mechanical mixing may not happen at exactly at the same time. It would instead be desirable to separately maximize the benefits of each of the chemical mixing and the mechanical mixing such that the benefits of enhanced chemical mixing and enhanced mechanical mixing can be realized together in the same system. As will be shown, the present system provides such a solution.

SUMMARY OF THE INVENTION

In preferred aspects, the present invention provides a hydro-diesel engine system, comprising:
  a diesel fuel tank having liquid diesel fuel therein;
  at least one hydrogen gas source;
  a bubbilizer configured to agitatedly mix hydrogen gas from the hydrogen gas source into the diesel fuel from the diesel fuel tank to form a mixture of small bubbles of hydrogen gas in the liquid diesel fuel;
  a hydro-diesel engine;
  a pumping system for sending the mixture of small bubbles of hydrogen gas in the liquid diesel fuel from the bubbilizer downstream into the hydro-diesel engine; and
  a system for chemically mixing some of the hydrogen gas with the diesel fuel prior to the diesel fuel entering the bubbilizer.

In various preferred aspects, the hydrogen gas is sent into the diesel fuel tank for chemical mixing prior to starting operation of the bubbilizer or the hydro-diesel engine. The advantage of this approach is that the hydrogen has a chance to simply sit and chemically mix with the diesel fuel for relatively long periods of time when the engine is turned off. This is a novel approach not seen in the prior art. Although existing hydro-diesel systems supply both hydrogen gas and diesel fuel to the engine, they are different from the present system in that they do not first chemically mix a first portion of the hydrogen gas with the diesel fuel, then allow that mixture to stand and react together and then later turn the engine on, supplying a second portion of the hydrogen gas into a bubbilizer to then be agitatedly mixed with the diesel fuel mixture.

In various aspects, the hydrogen gas can be chemically mixed with the diesel fuel in the diesel fuel tank, for example in a dedicated mixing chamber within the diesel fuel tank. In one optional aspect, the hydrogen gas is introduced into the bottom of the diesel fuel tank, and then allowed to chemically mix with the diesel fuel as it rises within the diesel fuel tank. In other optional aspects, various systems may be used within the diesel fuel tank itself to promote the chemical mixing of the hydrogen gas and the diesel fuel. For example, such systems may include internal baffles within the diesel fuel tank, a system to rotate or agitate or pressurize the diesel fuel tank to promote chemical mixing of the hydrogen gas with the diesel fuel, or even a mixing system to continuously mix the hydrogen gas and diesel fuel together within the diesel fuel tank (such as a moveable propeller or diaphragm). In various aspects, the chemical mixing chamber may be: (a) a chamber within the diesel fuel tank, (b) a chamber or tank positioned upstream of the diesel fuel tank, or (c) a chamber or tank positioned downstream of the diesel fuel tank and upstream of the bubbilizer.

In addition to the above described approaches of leaving the hydrogen gas and the liquid diesel fuel to mix for extended periods of time prior to turning on the engine (i.e.: thereby increasing the time for chemical mixing), the present invention also encompasses systems for increasing the distance through which the hydrogen gas and the liquid diesel fuel travel together when mixing (i.e.: thereby increasing the distance and time for chemical mixing). For example, the present system may optionally include an elongated flow channel running from the diesel fuel tank to the bubbilizer to promote chemical mixing of the hydrogen gas with the diesel fuel. Having a long flow channel running from the diesel fuel tank to the bubbilizer provides more opportunity for the hydrogen gas and diesel fuel to chemically mix prior to reaching the bubbilizer (where additional hydrogen gas is then agitatedly mixed into the diesel fuel/hydrogen gas mixture). In optional preferred aspects, the elongated flow channel may be coiled or serpentine in shape. It may also have internal baffles or a coarse internal surface to cause the hydrogen gas and the diesel fuel to chemically mix together.

In other aspects, the present system provides a method of operating a hydro-diesel engine system, comprising:
  providing liquid diesel fuel and hydrogen gas;
  chemically mixing a first portion of the hydrogen gas with the liquid diesel fuel;
  agitatedly mixing a second portion of the hydrogen gas into the liquid diesel fuel in a bubbilizer to form a mixture of small bubbles of hydrogen gas in the liquid diesel fuel; and then
  pumping the mixture of small bubbles of hydrogen gas in the liquid diesel fuel from the bubbilizer into the hydro-diesel engine.

In preferred aspects, the bubbilizer relies on a gas injector atomizer to mix the gas into the liquid diesel fuel. As understood herein, a "bubbilizer" is preferably a small device that functions to inject the hydrogen gas (and/or oxygen, and/or air) into the liquid diesel fuel.

In various aspects, the same hydrogen gas source supplies the first portion of the hydrogen gas that is sent into the diesel fuel tank (for chemical mixing) and the second portion of the hydrogen gas that is sent into the bubbilizer (for agitation mixing).

In further aspects of the present system, the bubbilizer may be removed, and the system operates to provide diesel fuel that has had the opportunity to have hydrogen gas chemically mixed into it. In such aspects, the present system provides a hydro-diesel engine system, comprising:

- a diesel fuel tank having liquid diesel fuel therein;
- a hydrogen gas source;
- a hydro-diesel engine;
- a pumping system for sending the liquid diesel fuel from the diesel fuel tank into the hydro-diesel engine; and
- a system for chemically mixing the hydrogen gas from the hydrogen gas source with the diesel fuel prior to the diesel fuel entering the hydro-diesel engine.

In these aspects of the present system, the hydrogen gas is preferably sent into the diesel fuel tank for chemical mixing prior to starting operation of the hydro-diesel engine. In optional aspects of this system, the diesel fuel tank is itself modified to promote chemical mixing with the hydrogen gas. For example, the diesel fuel tank may optionally have: a system of internal baffles, a system to rotate or agitate or even pressurize the diesel fuel tank, a system for introducing the hydrogen gas into the bottom of a diesel fuel tank, or a system to continuously mix the hydrogen gas and diesel fuel together within the diesel fuel tank.

In alternate aspects, the system for chemically mixing some of the hydrogen gas into the diesel fuel comprises an elongated flow channel running from the diesel fuel tank towards the hydro-diesel engine. This long channel through which the diesel fuel and hydrogen gas travel together promotes chemical mixing of the hydrogen gas with the diesel fuel. This elongated flow channel may optionally be coiled or serpentine in shape, and have internal baffles or a coarse internal surface to promote mixing.

In preferred aspects, the present system further comprises a hydro-diesel engine downstream of the bubbilizer, and the uniform homogeneous mixture of small bubbles of hydrogen gas in the liquid diesel fuel is pumped from the bubbilizer into the hydro-diesel engine.

Also included in the present system is an optional a return fuel line for returning uncombusted diesel fuel back from the hydro-diesel engine back into the bubbilizer. This return fuel line may optionally pass the uncombusted diesel fuel into one of: the diesel fuel tank, the bubbilizer, or a point downstream of the diesel fuel tank and upstream of the bubbilizer.

As stated above, in one preferred aspect the hydrogen gas is sent into the chemical mixing chamber and allowed to sit and mix chemically with the liquid diesel fuel prior to turning on the hydro-diesel engine. The advantage of this approach is optimal chemical mixing may take longer periods of time than optimal agitation mixing. In accordance with the present system, the vehicle's engine can be turned off while chemical mixing of the hydrogen gas and the diesel fuel is carried out. As a result, an optimal diesel/hydrogen fuel mixture can be prepared both during vehicle operation and also during the periods of time that the vehicle is not in operation.

In further optional embodiments, gasses in addition to hydrogen (for example, oxygen and hydrocarbon gasses including but not limited to natural gas, acetylene), air, etc. may also be added to the mixture of hydrogen gas and diesel fuel in the various embodiments of the present system described herein.

In further optional embodiments, the present system includes a hydro-diesel engine system, comprising:

- a diesel fuel tank having liquid fuel therein;
- a hydrogen gas source;
- a combiner for mixing the diesel fuel and hydrogen gas together to form a mixture of hydrogen gas and diesel fuel;
- a hydro-diesel engine; and
- a high-pressure pump positioned between and adjacent to both the combiner and a common rail of the hydro-diesel engine, wherein the high-pressure pump is configured to receive the mixture of hydrogen gas and diesel fuel from the combiner and to send the mixture into the common rail of the hydro-diesel engine.

Most preferably, in this embodiment, the distance between the combiner and common rail of the hydro-diesel engine does not exceed 6 inches; and the mixture of hydrogen gas and diesel fuel enters the high-pressure pump at approximately 1,000 psi and enters the common rail at approximately 30,000 psi. Optionally, the hydrogen gas source may be hydrogen gas tank or an electrolysis system. In addition, the system may further comprise a source of oxygen or hydrocarbon gas, wherein the oxygen or hydrocarbon gas is mixed with the diesel fuel and hydrogen gas in the combiner.

DETAILED DESCRIPTION OF THE DRAWINGS

Figure 1:
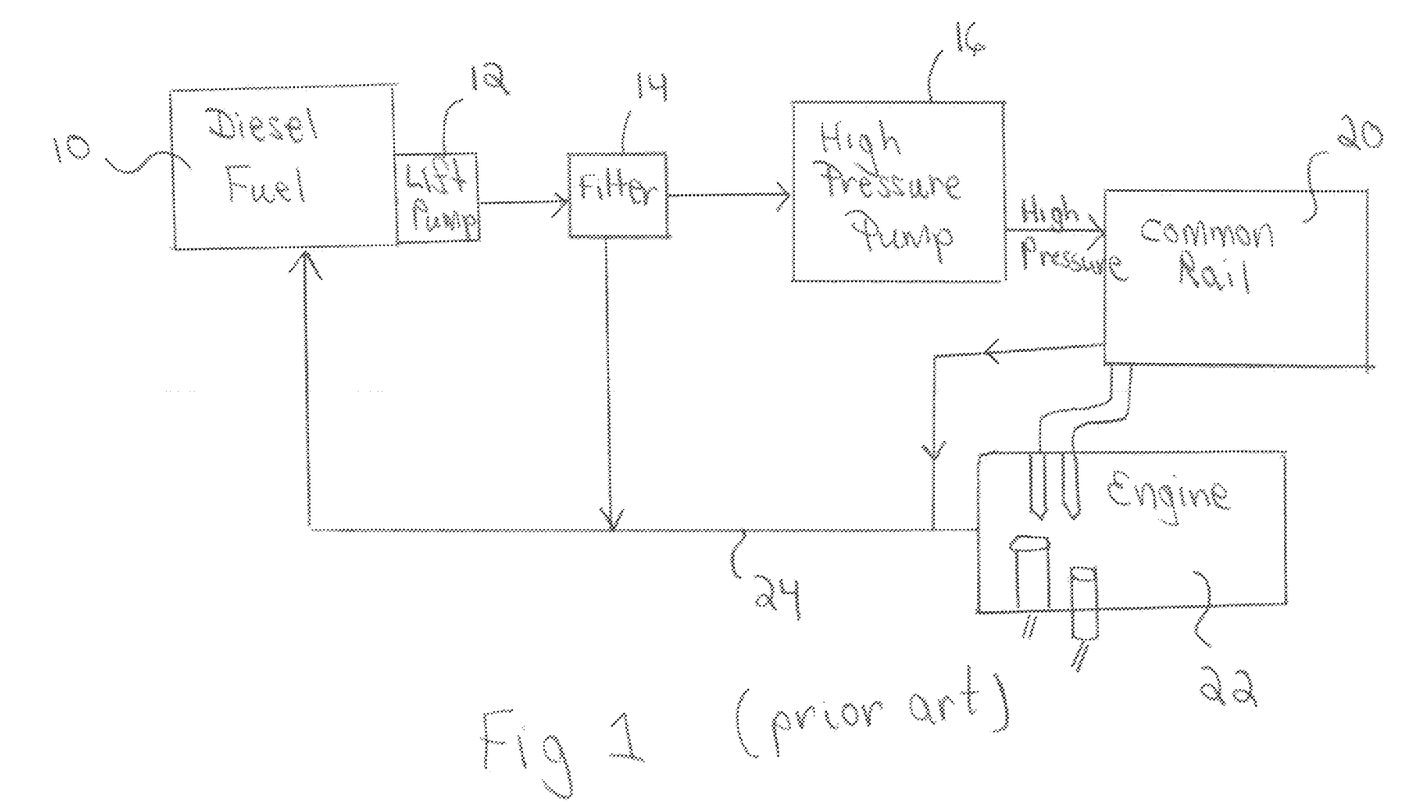
FIG. 1 is an illustration of a standard diesel engine.

FIG. 1 is an illustration of a standard prior art diesel engine. In this system, diesel fuel is in diesel fuel tank 10. A lift pump 12 moves the diesel fuel through a filter 14. In preferred aspects, filter 14 may have a 10 micron block age. A second optional filter may be used and may have a 4 micron blockage.

Next, a high-pressure pump 16 sends the diesel fuel into a common rail 20 of a diesel engine 22. High-pressure pump 16 may take the diesel fuel from low-pressure lift pump and then increase the pressure entering common rail 20 up to 12,000 to 14,000 psi. Common rail 20 receives the high-pressure fuel and then passes it on to separate combustion injectors in engine 22. Optionally, the injectors may be electronically controlled (by engine position detectors) or mechanically controlled (for example, by a cam running off of the engine). Optionally, the injectors may operate off of differences in pressure between the common rail 20 and the combustion chamber. Uncombusted diesel fuel from engine 20 may be passed into the diesel fuel tank 10 by return line 24.

Figure 2:
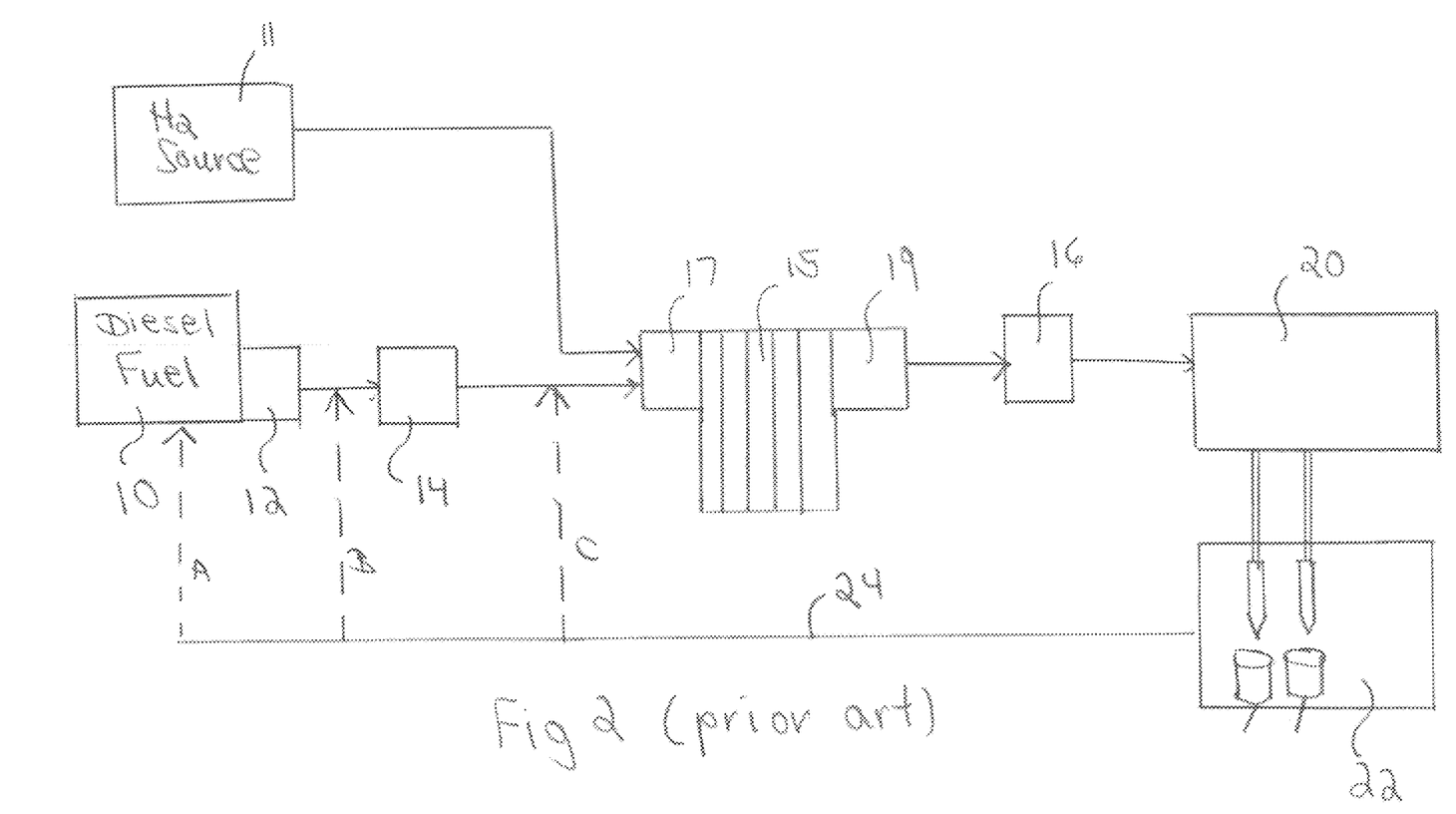
FIG. 2 is an illustration of a standard hydro-diesel engine showing alternate placements of a fuel return line.

Next, FIG. 2 is an illustration of a standard prior art hydro-diesel engine showing alternate placements of a fuel return line. The diesel fuel tank 10, lift pump 12, filter 14, high-pressure pump 16, common rail 20, diesel engine 22 and fuel return line 24 are all operate the same as in the standard diesel engine system of FIG. 1. In the hydro-diesel system of FIG. 2, however, a hydrogen source 11 (which may include a hydrogen gas tank) feeds a portion of its hydrogen gas into a bubbilizer 15. Bubbilizer 15 operates to agitatedly mix the hydrogen gas into the liquid diesel fuel to provide a uniform and homogeneous mixture of small or micro-sized bubbles of hydrogen gas uniformly distributed in the liquid diesel fuel. In optional embodiments, the bubbilizer 15 has either or both of an input pump 17 and an output pump 19.

In optional embodiments, hydrogen source 11 can be any hydrogen source (including, but not limited to electrolysis systems, hydrogen reformers or plasma technologies for generating the hydrogen gas).

Optionally, bubbilizer 15 can be any form of mixer or bubbilizer including systems with optional heating or vibration to enhance the agitation mixing of the hydrogen gas into the liquid diesel fuel.

Figure 3:
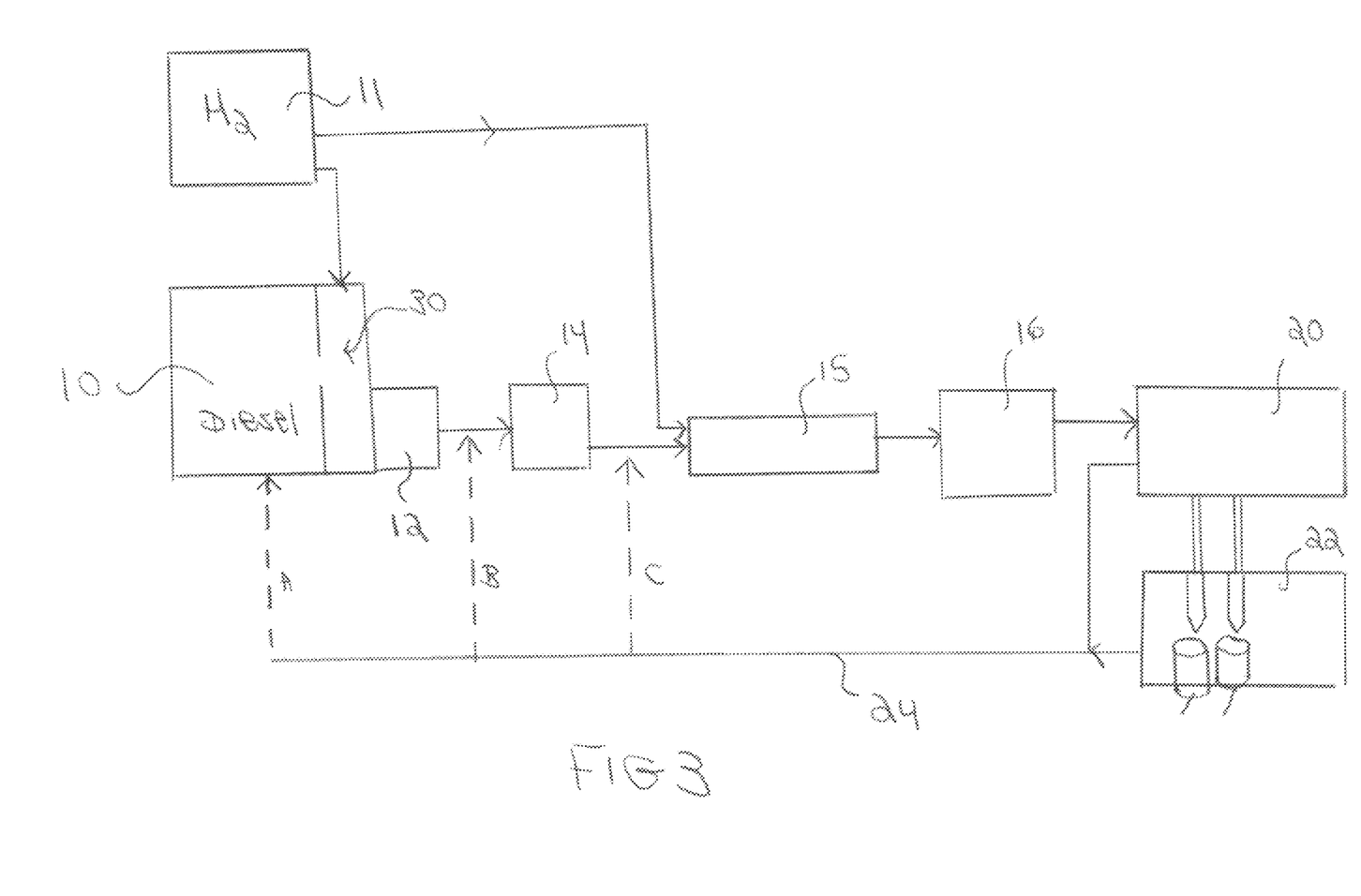
FIG. 3 is an illustration of the present hydro-diesel engine system having separate systems for separating agitation mixing and chemical mixing of hydrogen gas into liquid diesel fuel.

FIG. 3 is an illustration of one embodiment of the present hydro-diesel engine invention having separate components for separating agitation mixing and chemical mixing of hydrogen gas into liquid diesel fuel. In this system, components 10, 11, 12, 14, 16, 16 20, 22 and 24 operate in the same manner that was described above in reference to FIGS. 1 and 2. In the system of FIG. 3, however, the chemical and agitation mixing of the hydrogen gas into the liquid diesel fuel is separated, as follows.

The present system provides a hydro-diesel engine system, comprising: a diesel fuel tank 10 having liquid diesel fuel therein; a hydrogen gas source 11 (or other suitable hydrogen gas source) having hydrogen gas therein; a bubbilizer 15 in communication with both the diesel fuel tank 10 and the hydrogen gas source 11. The bubbilizer 15 receives the liquid diesel fuel from the diesel fuel tank 10 and the hydrogen gas from the hydrogen gas source 11 and then agitatedly mixes the hydrogen gas into the liquid diesel fuel to form a mixture of small bubbles of hydrogen gas in the liquid diesel fuel.

Importantly, however, the present system also provides a system for chemically mixing some of the hydrogen gas together with the diesel fuel prior to the diesel fuel entering the bubbilizer.

In preferred aspects, the system for chemically mixing hydrogen gas into the diesel fuel prior to the diesel fuel entering the bubbilizer may be a chemical mixing chamber 30 next to or within diesel fuel tank 10. In optional aspects, chemical mixing chamber 30 may be positioned within diesel fuel tank 10, as shown. In alternate aspects, the chemical mixing chamber 30 may be positioned upstream of the diesel fuel tank 10, or between the diesel fuel tank 10 and the bubbilizer 15.

As illustrated, a first portion of the hydrogen gas from the hydrogen gas source 11 is sent directly into a chemical mixing chamber 30 and a second portion of the hydrogen gas is sent directly into bubbilizer 15.

In accordance with various aspects of the present invention, a system is provided for chemically mixing some of the hydrogen gas together with the liquid diesel fuel prior to the diesel fuel entering the bubbilizer. Such chemical mixing may be accomplished in different ways and with different systems, as described herein, and encompassed within the scope of the present invention.

In several preferred aspects of the present system, hydrogen gas is sent into the diesel fuel tank for chemical mixing prior to even starting operation of the bubbilizer or the hydro-diesel engine. By allowing at least a portion of the hydrogen gas to simply sit in the diesel fuel tank prior to even turning the engine on, the present system provides the opportunity to have the hydrogen gas chemically mix into the liquid diesel fuel.

It is to be understood that the present invention preferably further comprises the hydro-diesel engine 22 downstream of bubbilizer 15, and the mixture of small bubbles of hydrogen gas in the liquid diesel fuel is pumped through common rail 20 into the hydro-diesel engine 22.

The present system preferably also comprises a return fuel line 24 for returning uncombusted diesel fuel back from the hydro-diesel engine into the bubbilizer. In optional preferred aspects (as shown by dotted lines in FIG. 3), the return fuel line passes the uncombusted diesel fuel into one of: the diesel fuel tank 10, the bubbilizer 15, or a point downstream of the diesel fuel tank but upstream of the bubbilizer.

Figure 4A:
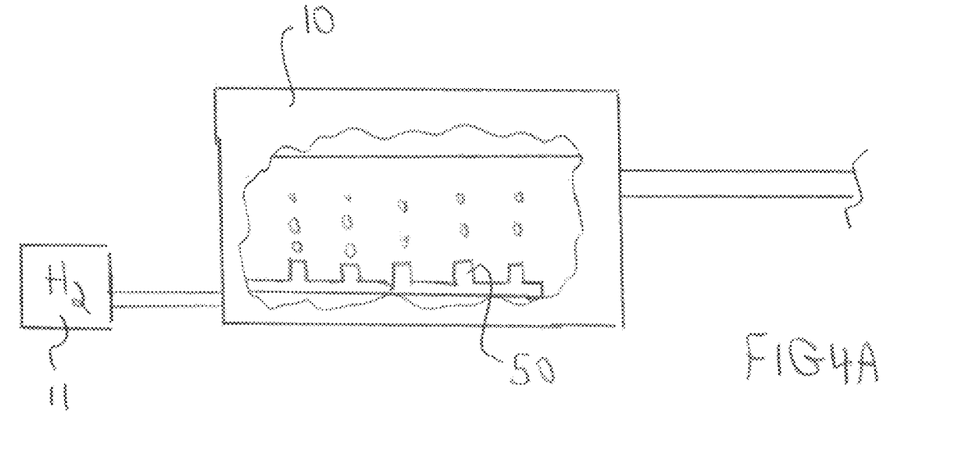
FIG. 4A shows an optional diesel fuel tank having a hydrogen gas manifold at its bottom.
Figure 4B:
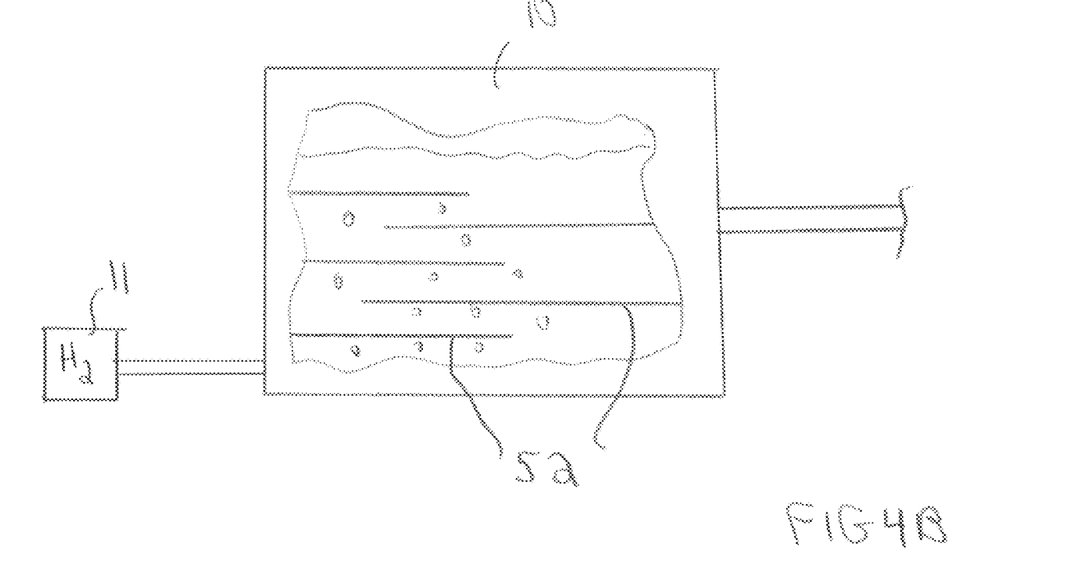
FIG. 4B is an illustration of an optional diesel fuel tank having internal baffles.
Figure 4C:
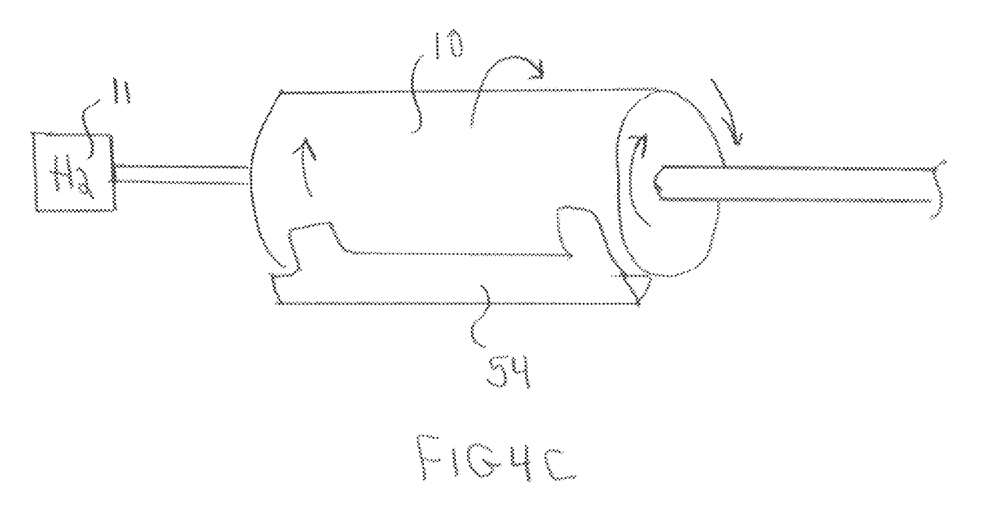
FIG. 4C is an illustration of an optional system for rotating a diesel fuel tank.

Next, as illustrated in FIGS. 4A, 4B and 4C, various systems can be provided at or within diesel fuel tank 10 to promote this chemical mixing of the hydrogen gas and the liquid diesel fuel, as follows.

FIG. 4A illustrates a diesel fuel tank 10 having a hydrogen manifold 50 inside near its bottom end. As hydrogen gas is introduced into tank 10 through hydrogen manifold 50, its bubbles float upwardly through the diesel fuel, thereby promoting chemical mixing.

FIG. 4B illustrates a diesel fuel tank 10 having internal baffles 52 to promote chemical mixing of the hydrogen gas with the diesel fuel. Specifically, as the hydrogen gas is introduced into the tank 10, it must travel back and forth through a non-linear path in the liquid diesel fuel, thereby mixing. It is to be understood that the illustrated internal baffles 52 may be horizontal, vertical or in some other orientation, all keeping within the scope of the present invention.

FIG. 4C illustrates a diesel fuel tank having a rotational system 54 that constantly turns the tank 10 to promote chemical mixing of the hydrogen gas and liquid diesel fuel within the tank. Optionally, the present system may also or instead include systems to rotate or agitate or even pressurize the diesel fuel tank 10 to promote chemical mixing of the hydrogen gas with the diesel fuel. Other optional systems may include any mixing system to continuously mix the hydrogen gas and diesel fuel together within the diesel fuel tank. Such systems may include rotating propellers or moving diaphragms. It is to be understood that all of the above mixing systems may be used alone or in combination with one another.

Figure 5:
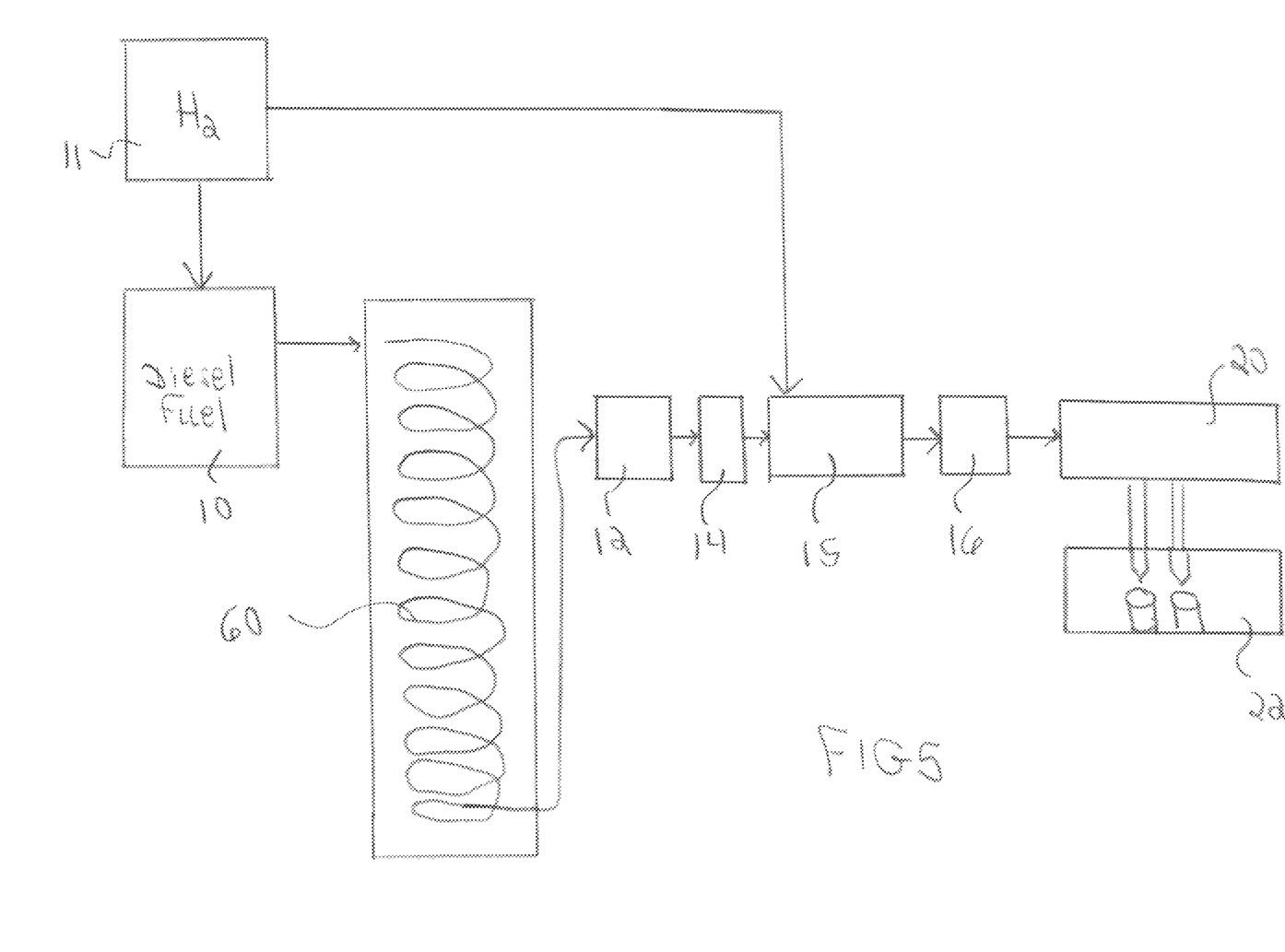
FIG. 5 is an illustration of an optional elongated flow channel between the diesel fuel tank and the bubbilizer.
Figure 6:
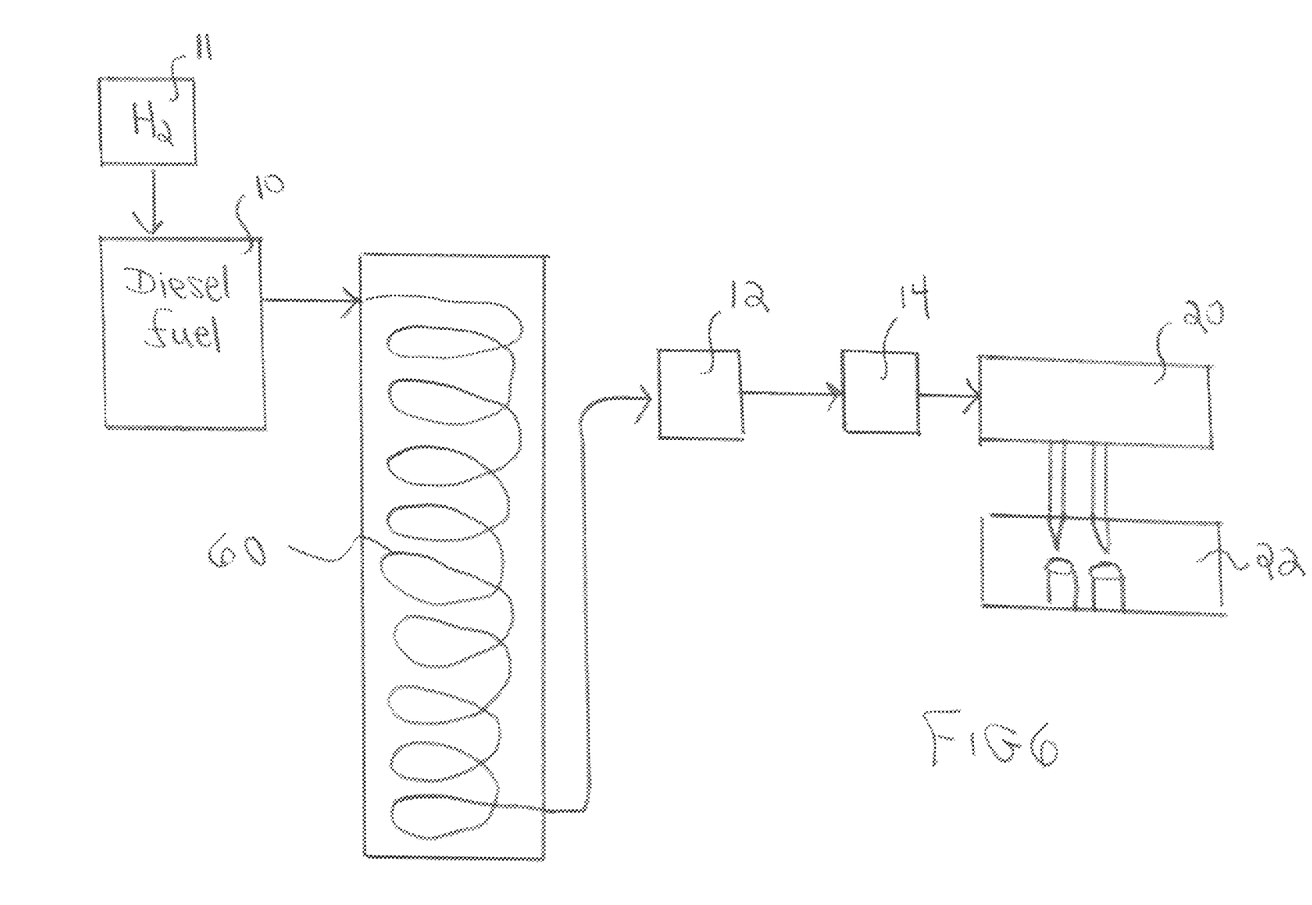
FIG. 6 is an illustration of a system in which the bubbilizer has been removed for chemically mixing hydrogen gas into diesel fuel prior to sending the mixture into an engine.

Next, as seen in FIGS. 5 and 6, the present invention includes systems to increase the physical distance travelled by the hydrogen gas and liquid diesel fuel together when moving from the diesel fuel tank to bubbilizer 15. For example, the present system may optionally include an elongated flow channel 60 that runs from diesel fuel tank 10 to bubbilizer 15 to promote chemical-mixing of the hydrogen gas together with the diesel fuel. As illustrated, the elongated flow channel 60 may even be coiled or serpentine in shape. In additional preferred embodiments, elongated flow channel 60 may have internal baffles or a coarse internal surface to promote mixing. It is to be understood that all of the above mixing systems may be used alone or in combination with one another.

As such, the present system also includes the preferred method of operating a hydro-diesel engine system, comprising:
- providing liquid diesel fuel and hydrogen gas;
- chemically mixing a first portion of the hydrogen gas with the liquid diesel fuel;
- agitatedly mixing a second portion of the hydrogen gas into the liquid diesel fuel in a bubbilizer to form a mixture of small bubbles of hydrogen gas in the liquid diesel fuel; and then
- pumping the mixture of small bubbles of hydrogen gas in the liquid diesel fuel from the bubbilizer into the hydro-diesel engine.

In other aspects of the present system, the bubbilizer (and its agitation mixing) is omitted and the present system instead only provides chemical-mixing of the hydrogen gas into the diesel fuel prior to the diesel fuel reaching the engine. As such, as best illustrated in FIG. 6, the present system also comprises a hydro-diesel engine system, comprising:
- a diesel fuel tank 10 having liquid diesel fuel therein;
- a hydrogen gas source 11;
- a hydro-diesel engine 22;
- a pumping system 12 and 16 for sending the liquid diesel fuel from the diesel fuel tank into the hydro-diesel engine 22; and
- a system for chemically mixing the hydrogen gas from the hydrogen gas source with the diesel fuel prior to the diesel fuel entering the hydro-diesel engine.

Similar to the above described embodiments, the hydrogen gas may be sent into the diesel fuel tank 10 for chemical mixing prior to starting operation of the hydro-diesel engine 22. Also similar to the above described embodiments, diesel fuel tank 10 may comprises one or more of: a system of internal baffles, a system to rotate or agitate or pressurize the diesel fuel tank, a system for introducing the hydrogen gas into the bottom of a diesel fuel tank, or a system to continuously mix the hydrogen gas and diesel fuel together within the diesel fuel tank. Optionally as well, the system for chemically mixing some of the hydrogen gas into the diesel fuel may comprise an elongated flow channel 60 running from diesel fuel tank 10 towards the hydro-diesel engine 22 to promote chemical mixing of the hydrogen gas with the diesel fuel. This elongated flow channel 60 may optionally be coiled or serpentine in shape, and have internal baffles or a coarse internal surface to promote mixing.

Figure 7:
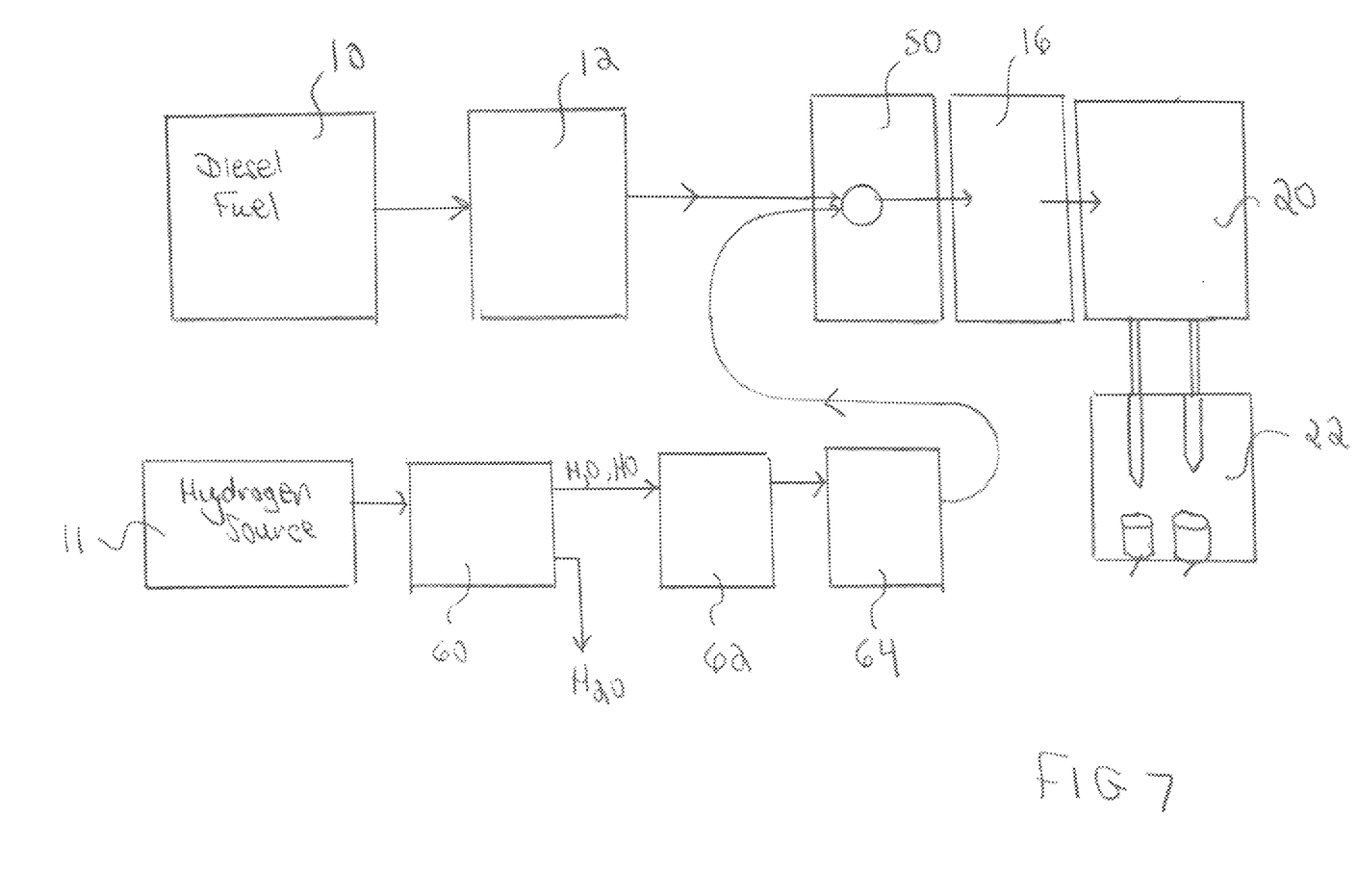
FIG. 7 is an illustration of an embodiment of the present system in which diesel fuel and hydrogen gas is combined immediately upstream of a high pressure pump and the common rail.

FIG. 7 is an illustration of an embodiment of the present system in which diesel fuel and hydrogen gas is combined immediately upstream of a high-pressure pump and the common rail, as follows. A diesel fuel tank 10 and a hydrogen gas source 11 are provided. A lift pump 12 directs the diesel fuel into a combiner 50. An optional electrolysis system 60 can be used to discard water and send gas (H, O, HO, etc.) into flow pump 62 and into circulation pump 64. Circulation pump 64 then sends the hydrogen gas (and optionally other gasses as well) into combiner 50. Combiner 50 mixes the diesel fuel and hydrogen gas together to form a mixture of hydrogen gas and diesel fuel. A source of oxygen, air or hydrocarbon gas may also be included such that the oxygen, air or hydrocarbon gas can also be mixed with the diesel fuel and hydrogen gas in combiner 50.

The high-pressure pump 16 is positioned between and adjacent to both combiner 50 and common rail 20. Most preferably, the separation distance between high-pressure pump 16 and each of combiner 50 and common rail 20 does not exceed 6 inches. Most preferably, the mixture of hydrogen gas and diesel fuel enters the high-pressure pump at approximately 1,000 psi and enters the common rail at approximately 30,000 psi.

What is claimed is:

1. A hydro-diesel engine system, comprising:
    a diesel fuel tank having liquid diesel fuel therein;
    at least one hydrogen gas source;
    a first fuel line running from the hydrogen gas source into the diesel fuel tank;
    a bubbilizer configured to agitatedly mix hydrogen gas from the hydrogen gas source into the diesel fuel from the diesel fuel tank to form a mixture of small bubbles of hydrogen gas in the liquid diesel fuel;
    a second fuel line running from the hydrogen gas source into the bubbilizer;
    a hydro-diesel engine;
    a pumping system for sending the mixture of small bubbles of hydrogen gas in the liquid diesel fuel from the bubbilizer downstream into the hydro-diesel engine; and
    a system for chemically mixing some of the hydrogen gas with the diesel fuel prior to the diesel fuel entering the bubbilizer.

2. The engine system of claim 1, wherein the hydrogen gas is sent through the second fuel line into the diesel fuel tank for chemical mixing prior to starting operation of the bubbilizer or the hydro-diesel engine.

3. The engine system of claim 1, wherein the hydrogen gas received through the second fuel line is chemically mixed with the diesel fuel in the diesel fuel tank.

4. The engine system of claim 3, wherein the hydrogen gas is chemically mixed with the diesel fuel in a mixing chamber in the diesel fuel tank in the diesel fuel tank.

5. The engine system of claim 3, wherein the hydrogen gas is introduced into the bottom of the diesel fuel tank.

6. The engine system of claim 3, wherein the diesel fuel tank has internal baffles to promote chemical mixing of the hydrogen gas with the diesel fuel.

7. The engine system of claim 3, further comprising:
    a system to rotate or agitate or pressurize the diesel fuel tank to promote chemical mixing of the hydrogen gas with the diesel fuel.

8. The engine system of claim 3, further comprising:
    a mixing system to continuously mix the hydrogen gas and diesel fuel together within the diesel fuel tank.

9. The engine system of claim 1, wherein the system for chemically mixing some of the hydrogen gas into the diesel fuel comprises:
    an elongated flow channel running from the diesel fuel tank to the bubbilizer to promote chemical mixing of the hydrogen gas with the diesel fuel.

10. The engine system of claim 9, wherein the elongated flow channel is coiled or serpentine in shape.

11. The engine system of claim 9, wherein the elongated flow channel has internal baffles.

12. The engine system of claim 9, wherein the elongated flow channel has a coarse internal surface.

13. A method of operating a hydro-diesel engine system, comprising:
prov255ing liquid diesel fuel and hydrogen gas;
separating the hydrogen gas into a first portion and a second portion;
sending the first portion of the hydrogen gas into a diesel fuel tank;
chemically mixing the first portion of the hydrogen gas with the liquid diesel fuel in the diesel fuel tank;
sending the second portion of the hydrogen gas into a bubbilizer;
agitatedly mixing a second portion of the hydrogen gas into the liquid diesel fuel in the bubbilizer to form a mixture of small bubbles of hydrogen gas in the liquid diesel fuel; and then
pumping the mixture of small bubbles of hydrogen gas in the liquid diesel fuel from the bubbilizer into the hydro-diesel engine.

14. The method of claim 13, wherein the step of chemically mixing a first portion of the hydrogen gas with the liquid diesel fuel is performed prior to starting operation of the bubbilizer or the hydro-diesel engine.

15. The method of claim 13, wherein the step of chemically mixing a first portion of the hydrogen gas with the liquid diesel fuel is performed by mixing the hydrogen gas and the diesel fuel together in the diesel fuel tank.

16. The method of claim 13, wherein chemically mixing the first portion of the hydrogen gas with the liquid diesel fuel comprises passing the first portion of the hydrogen gas and the liquid diesel fuel through an elongated flow channel running from the diesel fuel tank to the bubbilizer to promote mixing of the hydrogen gas and the diesel fuel.

17. A hydro-diesel engine system, comprising:
a diesel fuel tank having liquid diesel fuel therein;
a hydrogen gas source;
a first fuel path running from the hydrogen gas source into the diesel fuel tank;
a hydro-diesel engine;
a pumping system for sending the liquid diesel fuel from the diesel fuel tank into the hydro-diesel engine;
a second fuel path running from the hydrogen gas source into the hydro-diesel engine without passing through the diesel fuel tank; and
a system for chemically mixing the hydrogen gas from the hydrogen gas source with the diesel fuel prior to the diesel fuel entering the hydro-diesel engine.

18. The engine system of claim 17, wherein the hydrogen gas is sent into the diesel fuel tank for chemical mixing prior to starting operation of the hydro-diesel engine.

19. The engine system of claim 17, wherein the system for chemically mixing the hydrogen gas into the diesel fuel comprises one of:
a system of internal baffles in a diesel fuel tank,
a system to rotate or agitate or pressurize the diesel fuel tank,
a system for introducing the hydrogen gas into the bottom of a diesel fuel tank, or
a system to continuously mix the hydrogen gas and diesel fuel together within the diesel fuel tank.

20. The engine system of claim 17, wherein the system for chemically mixing some of the hydrogen gas into the diesel fuel comprises:
an elongated flow channel running from the diesel fuel tank towards the hydro-diesel engine to promote chemical mixing of the hydrogen gas with the diesel fuel.

21. The engine system of claim 20, wherein the elongated flow channel:
is coiled or serpentine in shape,
has internal baffles, or
has a coarse internal surface.

22. A hydro-diesel engine system, comprising:
a diesel fuel tank having liquid fuel therein;
a hydrogen gas source;
a combiner for mixing the diesel fuel and hydrogen gas together to form a mixture of hydrogen gas and diesel fuel;
a first fuel line running from the hydrogen gas source into the diesel fuel tank;
a second fuel line running from the hydrogen gas source into the combiner;
a hydro-diesel engine; and
a high-pressure pump positioned between and adjacent to both the combiner and a common rail of the hydro-diesel engine, wherein the high-pressure pump is configured to receive the mixture of hydrogen gas and diesel fuel from the combiner and to send the mixture into the common rail of the hydro-diesel engine.

23. The system of claim 22, wherein the distance between the combiner and common rail of the hydro-diesel engine does not exceed 6 inches.

24. The system of claim 22, wherein the mixture of hydrogen gas and diesel fuel enters the high-pressure pump at approximately 1,000 psi and enters the common rail at approximately 30,000 psi.

25. The system of claim 22, wherein the hydrogen gas source is a hydrogen gas tank or an electrolysis system.

26. The system of claim 22, further comprising:
a source of oxygen or hydrocarbon gas, wherein the oxygen or hydrocarbon gas is mixed with the diesel fuel and hydrogen gas in the combiner.

* * * * *